United States Patent [19]
Weber

[11] Patent Number: 5,911,245
[45] Date of Patent: Jun. 15, 1999

[54] FLOW FORCE SPOOL VALVE

[75] Inventor: J. Roger Weber, Chillicothe, Ill.

[73] Assignee: Caterpillar Inc., Peoria, Ill.

[21] Appl. No.: 09/093,644

[22] Filed: Jun. 9, 1998

[51] Int. Cl.$^6$ .................................................. F15B 13/044
[52] U.S. Cl. .............................. 137/625.65; 137/625.69; 251/129.07
[58] Field of Search ..................... 137/625.65, 625.69; 251/129.07

[56]     References Cited

U.S. PATENT DOCUMENTS

| | | | |
|---|---|---|---|
| 3,151,630 | 10/1964 | Tennis | 137/596.2 |
| 3,729,026 | 4/1973 | Wilke | 137/625.69 |
| 3,735,780 | 5/1973 | Heid | 137/625.69 |
| 3,738,379 | 6/1973 | Wilke | 137/106 |
| 3,959,024 | 5/1976 | Kirk et al. | 137/625.25 |
| 3,990,477 | 11/1976 | Johnson | 137/625.69 |
| 4,009,864 | 3/1977 | Schexnayder | 251/282 |
| 4,122,867 | 10/1978 | Zagotta | 137/625.3 |
| 4,220,178 | 9/1980 | Jackson | 137/625.3 |
| 4,463,660 | 8/1984 | Mucheyer et al. | 91/469 |
| 5,131,514 | 7/1992 | Machida | 192/85 R |
| 5,597,118 | 1/1997 | Carter et al. | 137/625.65 X |
| 5,598,871 | 2/1997 | Sturman et al. | 137/625.65 |
| 5,829,396 | 11/1998 | Sturman | 137/625.65 X |

Primary Examiner—Gerald A. Michalsky
Attorney, Agent, or Firm—Larry G. Cain; Fred J. Beahr

[57]     ABSTRACT

A spool valve comprising a body portion with a general center bore, three annular chambers and a seal land between adjacent chambers, a spool portion slidably disposed in the bore and having two semicircular circumferential grooves to form a spool land associated with each of the chambers, the spool lands and seal lands being so disposed that when the spool is in a first position the annular chamber on one end is in fluid communication with the center chamber and the spool land associated with the one end chamber and the spool land associated with the center chamber are equidistant from the adjacent seal land and the other seal land and the spool land associated with the chamber on the other end cooperates with the other seal land to form a seal between the center chamber and the other end chamber and when in a second position the annular chamber on other end is in fluid communication with the center chamber and the spool land associated with the other end chamber and the spool land associated with the center chamber are equidistant from the adjacent seal land and the other seal land and the spool land associated with the chamber on the one end cooperates with the other seal land to form a seal between the center chamber and the other end chamber, whereby the flow forces of high pressure fluid acting on the spool cancel out and the force required to move to the spoon between positions is minimized 9 Claims, 2 Drawing Sheets

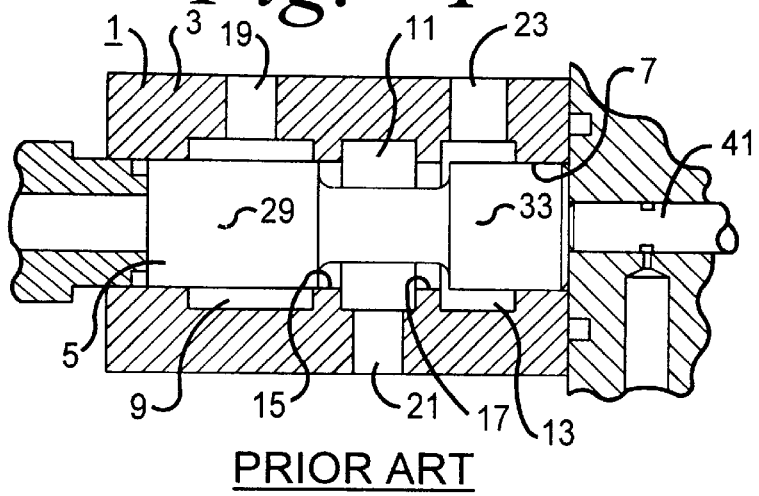
Fig. - 1 -
PRIOR ART
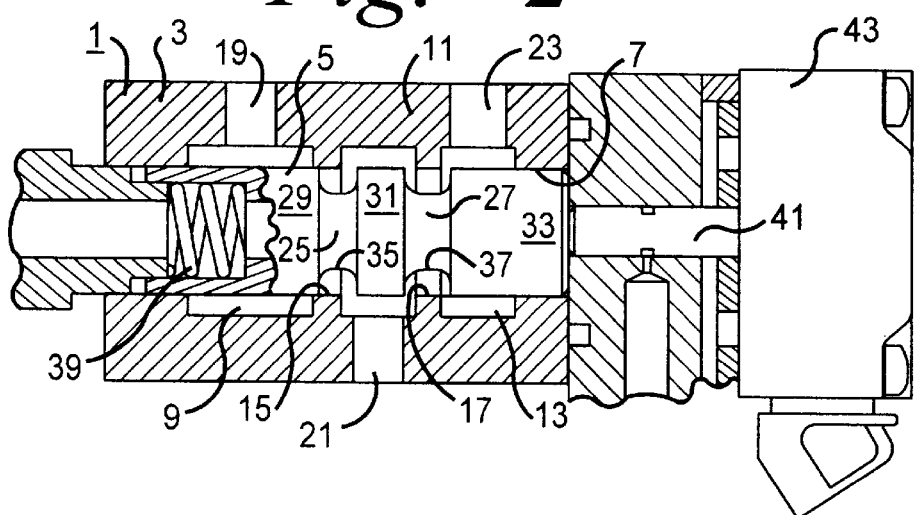
Fig. - 2 -
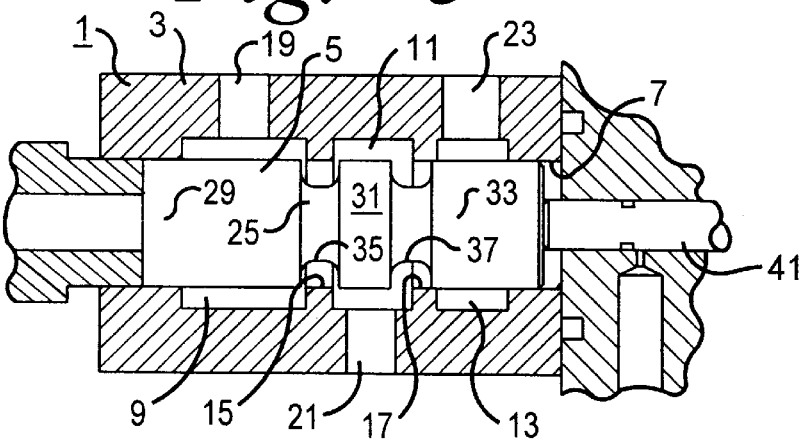
Fig. - 3 -

Fig. - 4 -
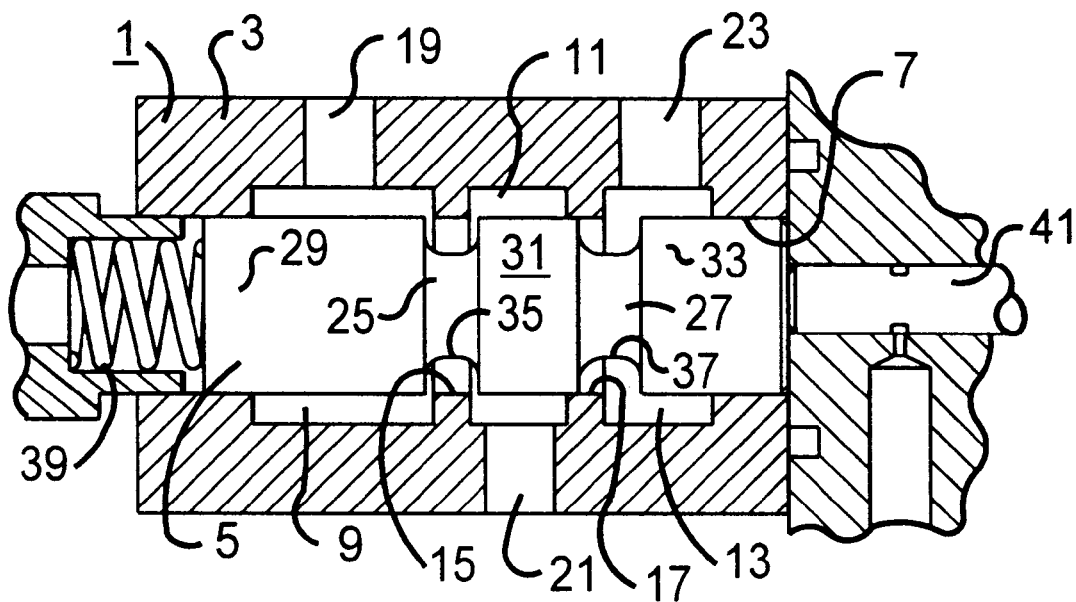
Fig. - 5 -
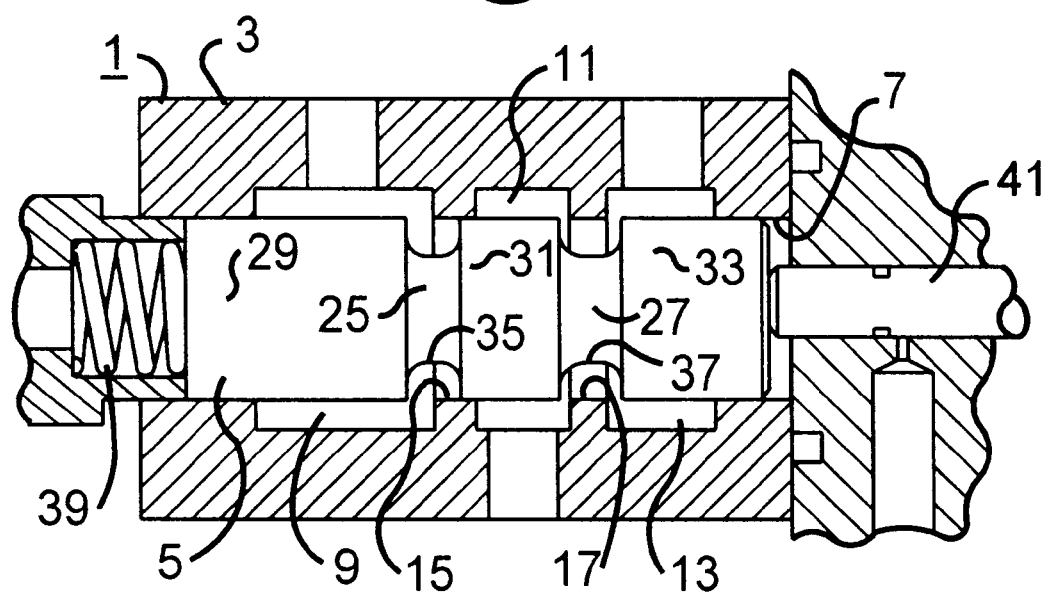

FLOW FORCE SPOOL VALVE

TECHNICAL FIELD

The invention relates to a spool valve and more particularly to a spool valve that balances the dynamic forces of the high pressure fluid flowing over the spool so that the force required to operate the spool valve is minimized.

BACKGROUND ART

Spool valves are used in a wide variety of applications to control flow in hydraulic circuits. More specifically they are being used in the variable valve timing camless engine being developed. The camless engine uses spool valves to indirectly actuate the engine valves and unit fuel injectors by controlling the hydraulic pressure supplied to them. The spool valves in the camless engine are actuated by solid state motors or solenoids. The magnitude of the forces induced by the hydraulic fluid flowing over the spool tend to be significant when compared to the actuating force applied by the solid state motors or solenoids. Hence a low flow force spool valve offers significant control advantage over a conventional spool valve as shown in FIG. 1 and designated as prior art. U.S. Pat. No. 4,220,178 describes a method of shaping the shank of a hydraulic control spool valve to alter the momentum exchange from high pressure fluid flowing across the spool. The shank is shaped to turn the high velocity stream away from the spool at a lesser angle than the entry angle of the stream while utilizing conventional square edge lands.

DISCLOSURE OF THE INVENTION

Among the objects of this invention may be noted the provision of a spool valve, wherein the dynamic force of the high pressure fluid flowing across the spool are generally equal and opposite and tend to cancel out when the valve is fully open.

In general, a spool valve, when made in accordance with this invention comprises a body portion and a spool portion. The body portion having a generally center bore for slidably receiving the spool portion and three annular fluid chambers with a seal land disposed between adjacent annular fluid chambers. One of the end chambers having an inlet port for high pressure fluid, a center chamber having a port for providing fluid communication with a hydraulic device and the other end chamber having a drain port. The spool portion having two circumferential groves disposed to form a spool land portion associated with each annular fluid chamber and cooperatively associated with the adjacent seal land to form a seal between adjacent chambers. When the spool is in a first position, the chamber on the one end of the body is in fluid communication with the center chamber. When the spool is in a second position, the chamber on the other end of the body is in fluid communication with the center chamber. The width of the seal land between the chamber on the one end and the center chamber and the distance between the spool land associated with the chamber on the one end and the spool land associated with the center chamber being such that when the valve is in the first position edges of the seal land are equidistant from adjacent edges of the adjacent spool lands. Whereby the flow forces on the spool cancel out when the valve is in its first position and the force required to operate the valve and move the spool to the second position is minimized. When the valve is in the second position, the width of the seal land between the center chamber and the chamber on the other end of the valve and the distance between the associated adjacent spool lands is such that when the valve is in the second position edges of the seal land are equidistant from edges of associated adjacent spool lands whereby the flow forces on the spool cancel out and the force required to operate the valve and move the spool to the first position is minimized.

BRIEF DESCRIPTION OF THE DRAWINGS

The invention as set forth in the claims will become more apparent by reading the following detailed description in conjunction with the accompanying drawings, wherein like reference numerals refer to like parts throughout the drawings and in which:

FIG. 1 is a partial sectional view of a prior art spool valve;

FIG. 2 is a partial sectional view of a spool valve made in accordance with this invention;

FIG. 3 is a partial sectional view of the spool valve in FIG. 2 shown with the spool in a different position;

FIG. 4 is a partial sectional view of a spool valve similar to the one in FIG. 2 but with the spring bias resulting in the opposite fluid communication between annular chambers; and FIG. 5 is a partial sectional view of the spool valve shown in FIG. 4 with the spool in a different position.

BEST MODE FOR CARRYING OUT THE INVENTION

Referring now to the drawings in detail and in particular to FIG. 2, there is shown a two position spool valve 1 comprising a body portion 3 and a spool portion 5. The body portion 3 has a generally center bore 7 for slidably receiving the spool portion 5. Three annular chambers 9, 11 and 13 are so disposed in the body portion 3 to form seal lands 15 and 17 between the adjacent annular chambers 9 and 11 and 11 and 13, respectively. The annular chamber 9 on one end has an inlet port 19 for influent high pressure fluid. The center annular chamber 11 has a port 21 in fluid communication with a hydraulic device such as a valve lifter or a fuel injector (not shown). The annular chamber 13 on the other end of the body portion 3 has an effluent or drain port 23 in fluid communication therewith.

The spool portion 5 has two circumferential grooves 25 and 27 so disposed to form a spool land portion 29, 31 and 33 associated with the annular chambers 9, 11 and 13, respectively. When properly positioned the spool lands 29 and 33 are cooperatively associated with the seal lands 15 and 17 to form a seal between adjacent annular chambers 9 and 11, and 11 and 13, respectively. The grooves 25 and 27 have a semicircular or arcuate bottom portion 35 and 37, respectively, to improve the flow characteristics of the fluid flowing between the chambers 9 and 11, and 11 and 13. The end spool lands 29 and 33 have a width that is wider than the width of the annular chambers 9 and 13, respectively. The width of the spool land 31 is considerably less than the width of the center chamber 11 and does not form a seal with the seal lands 15 and 17. Its only purpose is to balance the dynamic forces of the high pressure hydraulic fluid flowing over the spool, when the valve is open.

A spring 39 biases the spool portion 5 to a first position. When in the first position, the chamber 13 on the one end of the body portion 3 is in fluid communication with the central chamber 11. The square edges of the seal land 17 are equidistant from the adjacent square edges of the spool land portions 31 and 33. The adjacent edges are generally spaced apart about one half a millimeter, whereby the flow forces of the high pressure fluid flowing between the chambers 11 and 13 tend to cancel out. Thus, the force applied to a plunger 41 to move the spool to a second position by an electrical signal supplied by an electronic control module (not shown) and applied to a piezoelectric solid state device or a solenoid 43 to move the plunger 41 and the spool portion 5 against the bias of the spring 39 is minimal. The spool land 29 cooperates with the seal land 15 to form a seal between the end chamber 9 and the center chamber 11.

FIGS. 3, 4 and 5 do not show the solid state device or solenoid 43, but it is understood that such a device moves the spool 5.

Referring now to FIG. 3, the spool valve 1 is shown with the spool portion disposed in its second position. When in the second position, the chamber 9 on the other end of the body portion 3 is in fluid communication with the central chamber 11. The square edges of the seal land 15 are equidistant from the adjacent square edges of the spool land portions 29 and 31. The adjacent edges are generally spaced apart about one half a millimeter, whereby the flow forces of the high pressure fluid flowing between the chambers 9 and 11 tend to cancel out and the bias applied by the spring 39 to move the spool portion 5 to the first position when an electrical signal supplied by an electronic control module (not shown) and applied to a piezoelectric solid state device or a solenoid 43 is discontinued. The spool land portion 33 cooperates with the seal land portion 17 to form a seal between the center chamber 11 and the end chamber 13.

FIG. 4 is essentially the same as FIG. 2, except that the spool portion 5 are inverted. That is, the bias of the spring 39 holds the spool valve in the first position and the annular chamber 9 in fluid communication with the center chamber 11. The spool land 29 cooperating with the seal land 17 to form a seal between the center chamber and the end chamber 13. The spool lands 29, 31 and 33 are slightly different lengths but maintain the equivalent half millimeter clearance with the seal land 15 and the spool lands 29 and 31.

FIG. 5 is the same as FIG. 4 except the plunger 41 has been moved by the piezoelectric device or solenoid 43 to move the spool portion against the bias of the spring 39 to bring the central chamber 11 in fluid communication with the end chamber 13. The spool land 21 cooperates with the seal land 15 to form a seal between the end chamber 9 and the center chamber 13. The spool lands 31 and 33 generally maintain the half millimeter clearance with the seal land 17.

While the preferred embodiments described herein set forth the best mode to practice this invention presently contemplated by the inventor, numerous modifications and adaptations of this invention will be apparent to others of ordinary skill in the art. Therefore, the embodiments are to be considered as illustrative and exemplary and it is understood that the claims are intended to cover such modifications and adaptations as they are considered to be within the spirit and scope of this invention.

Industrial Applicability

A spool valve, when made in accordance with this invention, advantageously provides a spool valve wherein the dynamic forces resulting from the highly pressurized hydraulic fluid flowing across the spool grooves are generally equal and opposite and therefore cancel out, allowing the spool to be moves from on position to another with a minimal of external force. Thus, the spool valve can be moved between positions by a piezoelectric device or small solenoid even when controlling a highly pressurized hydraulic fluid.

What is claimed is:

1. A two position spool valve having a body portion and a spool portion, the body portion having a generally center bore for slidably receiving the spool portion and three annular fluid chambers with a seal land disposed between adjacent annular fluid chambers, one of the end chambers having an influent port for high pressure fluid, a center chamber having a port for providing fluid communication with a hydraulic device and the other end chamber having a effluent port; the spool portion having two circumferential grooves disposed to form a spool land portion associated with each annular fluid chamber and cooperatively associated with the adjacent seal land to form a seal between adjacent chambers; when the spool is in a first position the chamber on the one end of the body is in fluid communication with the center chamber and when the spool is in a second position the chamber on the other end of the body is in fluid communication with the center chamber; the width of the seal land between the chamber on the one end and the center chamber and the distance between the spool land associated with the chamber on the one end and the spool land associated with the center chamber being such that when the valve is in the first position edges of the seal land are equidistant from adjacent edges of the adjacent spool lands, when the spool is in the second position, the width of the seal land between the center chamber and the chamber on the other end of the valve and the distance between the associated adjacent spool lands is such that when the valve is in the second position edges of the seal land are equidistant from edges of associated adjacent spool lands, whereby the flow forces on the spool cancel out when the valve is in its first and second position and the force required to operate the valve to move to the second and to the first position is minimized.

2. The spool valve as set forth in claim 1, wherein the circumferential grooves between spool lands have an arcuate bottom portion to improve the flow characteristics of the fluid flowing between the chambers.

3. The spool valve as set forth in claim 2, wherein the spool valve is moved from one position to the other position in response to an electrical signal.

4. The spool valve as set forth in claim 3, wherein a spring biases the spool portion to the first position.

5. The spool valve as set forth in claim 4, wherein the electrical signal produces a force to move a plunger to overcome the spring bias and move the spool portion to the second position.

6. The spool valve as set forth in claim 3, wherein a spring biases the spool portion to the second position.

7. The spool valve as set forth in claim 6, wherein the electrical signal produces a force to move a plunger to overcome the spring bias and move the spool portion to the first position.

8. The spool valve as set forth in claim 1, wherein the width of the spool land associated with the central chamber is less than the width of the central chamber.

9. The spool valve as set forth in claim 8, wherein the width of the spool lands associated with the end chambers are greater than the width of the associated end chamber.

* * * * *